United States Patent [19]
Nakamura et al.

[11] Patent Number: 5,180,609
[45] Date of Patent: Jan. 19, 1993

[54] METHOD OF FORMING MODIFIED PORTION AND MAGNETIC RECORDING MEMBER USING THIS METHOD

[75] Inventors: Ei Nakamura, Yokosuka; Mitsuo Sasaki, Yokohama; Hiromi Nakamura, Zama, all of Japan

[73] Assignees: Kabushiki Kaisha Toshiba, Kawasaki; Toshiba Machine Co., Ltd., Tokyo, both of Japan

[21] Appl. No.: 770,893

[22] Filed: Oct. 4, 1991

Related U.S. Application Data

[63] Continuation of Ser. No. 320,621, Mar. 8, 1989, Pat. No. 5,100,692.

[30] Foreign Application Priority Data

Mar. 9, 1988 [JP] Japan .................................. 63-55366

[51] Int. Cl.$^5$ .......................... B05D 3/06; B05D 5/12; B44C 1/22; H01L 21/306
[52] U.S. Cl. ..................................... 427/595; 427/130; 427/131; 156/632; 156/645
[58] Field of Search ...................... 427/53.1, 43.1, 130, 427/131; 156/632, 645

[56] References Cited

U.S. PATENT DOCUMENTS

| | | | |
|---|---|---|---|
| 3,900,593 | 8/1975 | Herczog et al. | 427/53.1 |
| 3,959,553 | 5/1976 | Hartmann et al. | 427/131 |
| 4,254,189 | 3/1981 | Fisher | 427/131 |
| 4,650,708 | 3/1987 | Takahashi | 427/131 |
| 4,664,941 | 5/1987 | Washburn | 427/53.1 |
| 4,871,582 | 10/1989 | Miyabayashi | 427/130 |
| 4,964,967 | 10/1990 | Hashimoto et al. | 427/53.1 |

FOREIGN PATENT DOCUMENTS 62-42003  2/1987  Japan .

*Primary Examiner*—Marianne Padgett
*Attorney, Agent, or Firm*—Oblon, Spivak, McClelland, Maier & Neustadt

[57] ABSTRACT

A member is prepared by forming a magnetic surface layer on a magnetic base member having a different composition from the surface layer. A laser beam is radiated onto the member so as to fuse the member and the surface layer, thereby forming a fused portion having magnetic properties. A modified portion is formed in a portion of the fused portion corresponding to the surface layer such that this portion has different permeability from other portions of the surface layer.

2 Claims, 4 Drawing Sheets

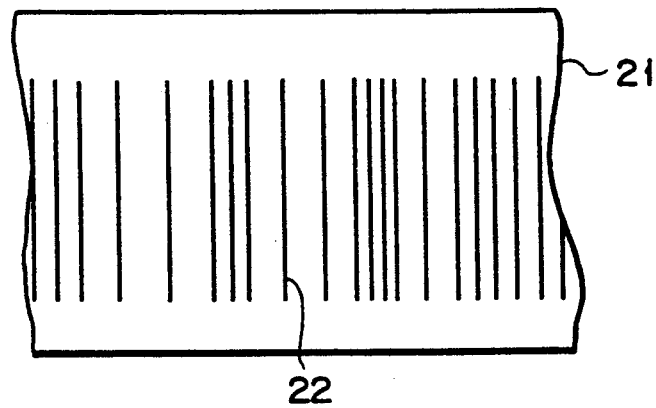
F I G. 8
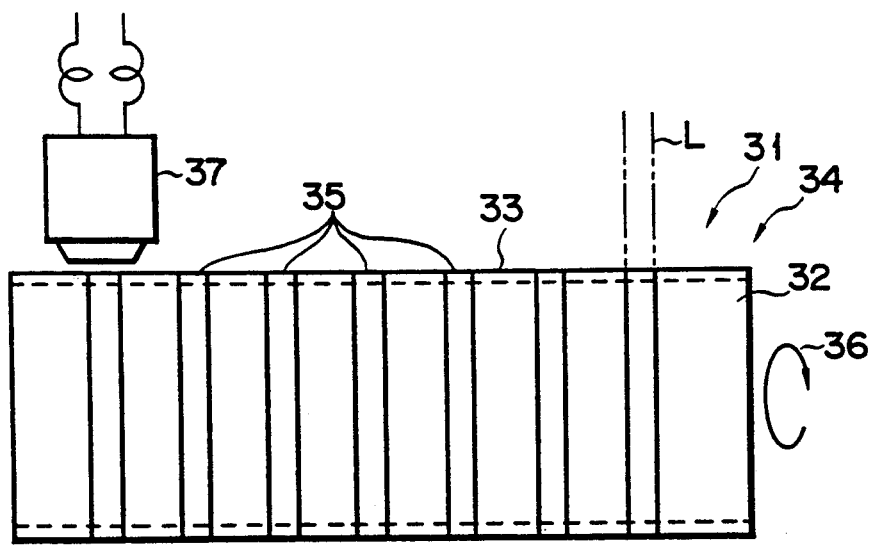
F I G. 9

METHOD OF FORMING MODIFIED PORTION AND MAGNETIC RECORDING MEMBER USING THIS METHOD

This is a continuation of application Ser. No. 07/320,621, filed on Mar. 8, 1989 and issued Mar. 31, 1992 as U.S. Pat. No. 5,000,692.

BACKGROUND OF THE INVENTION

1. Field of the Invention

The present invention relates to a method of forming a modified portion by radiating a high-energy beam onto a given portion, and a magnetic recording member using this modified portion.

2. Description of the Related Art

Conventionally, in magnetic recording apparatuses, magnetic cards, floppy disks, identification cards, magnetic scales, and the like, recording of data, such as scale marks and signals, is performed by forming a coat of a magnetic powder, a magnetic thin film, or the like on a surface of a predetermined member and locally magnetizing the coat of the magnetic power or the like by using an external magnetic field.

When data is recorded by such a method, however, the magnetic characteristics of the coat of the magnetic powder or the like are changed at a relatively low temperature of 100° C. or less, and are susceptible to the influences of an external magnetic field. Therefore, recorded data may be easily destructed due to mishandling, such as placing a magnet near the coat, and deterioration over time. In addition, such a coat and a thin film have considerably poor wear resistance and the like compared with general structural metal materials, and hence cannot be used in an environment requiring good wear resistance and the like.

SUMMARY OF THE INVENTION

An object of the present invention is to solve the above-described problems, and a further object is to provide a method of forming a modified portion having characteristics which can be stably maintained at high temperatures and in an environment of substantial wear, and a magnetic recording member using this method.

A method of forming a modified portion according to the present invention comprises the steps of preparing a member which comprises a plurality of layers having different compositions and has a modified portion-formable region, and forming a magnetic modified portion having higher permeability than a non-fused portion of the modified portion-formable region by radiating a high-energy beam onto the member so as to fuse at least two layers at a portion including the modified portion-formable region.

In addition, a magnetic recording member according to the present invention comprises a recording member which comprises a plurality of layers having different compositions and has a modified portion-formable region, and a magnetic modified portion which is formed by radiating a high-energy beam onto the recording member so as to fuse at least two layers at a portion including the modified portion-formable region and has higher permeability than non-fused portion of the modified portion-formable region. The position and shape of the modified portion can be changed in accordance with data to be recorded.

The modified portion may be formed of a magnetic material having lower permeability than the non-fused portion of the modified portion-formable region.

According to the present invention, a high-energy beam is radiated onto a member so as to fuse at least two layers at a portion including a modified portion-formable region, so that a modified portion having different permeability from a non-fused portion of the modified portion-formable region is formed in the portion. In this case, since the modified portion is formed upon fusion by a high-energy beam, the shape of the modified portion is not changed at a relatively high temperature. In addition, since the modified portion has no coat nor thin film, it has excellent wear resistance. Therefore, it can be used in an environment in which it is subjected to substantial wear.

Note that "different compositions" herein include a case wherein the materials of a plurality of layers are different from each other and a case wherein only compositions of the same materials are different.

BRIEF DESCRIPTION OF THE DRAWINGS

FIG. 8 is a plan view of a recording member in which a plurality of modified portions are formed;

FIG. 9 is a side view of a magnetic scale having annular modified portions;

DETAILED DESCRIPTION OF THE PREFERRED EMBODIMENTS

An embodiment of the present invention will be described in detail below with reference to the accompanying drawings.

Note that "SS41", "SUS316", and "SUS304" in this embodiment represent JIS (Japanese Industrial Standard) of steels. SS41 is a general structural low-carbon steel; SUS316, a heat-resistant austenitic stainless steel (18% Cr, 12% Ni, 2.5% Mo); and SUS304, an austenitic stainless steel (18% Cr, 8% Ni).

Figure 1:
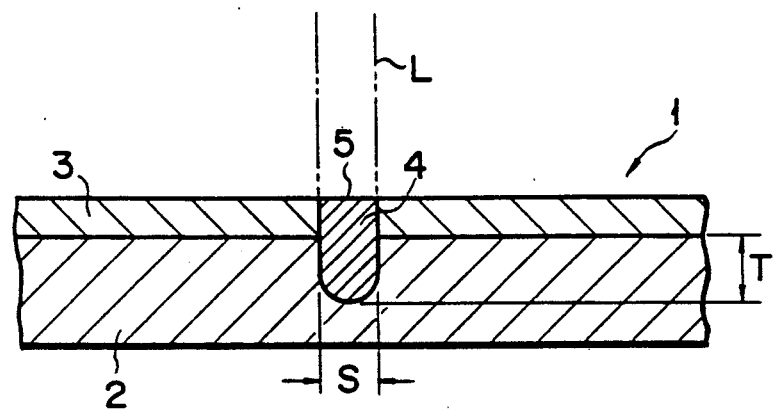
FIG. 1 is a sectional view of a member consisting of a two-layer member to which a method of forming a modified portion according to an embodiment of the present invention is applied.

FIG. 1 is a sectional view of a laminated member constituted by two layers to which a method of forming a modified portion according to the present invention is applied. A member 1 is designed such that a surface layer (first layer) 3 is coated on a plate-like base member (second layer) 2 by flame spraying, plating, or the like. The base member 2 and the surface layer 3 may be magnetic or nonmagnetic members, and are constituted by materials which are properly selected so as to form a modified portion described later. Four combinations of the base member 2 and the surface layer 3 presented below are plausible. First, the base member 2 and the surface layer 3 are magnetic and nonmagnetic members, respectively. Second, the base member 2 and the surface layer 3 are nonmagnetic and magnetic members, respectively. Third, both the base member 2 and the surface layer 3 are nonmagnetic members. Lastly, both the base member 2 and the surface layer 3 are magnetic members. In examples of the first combination, the base member 2 is formed of a low-carbon steel (e.g., SS41); and the surface layer 3, an austenitic stainless steel (e.g., SUS316), and the base member 2 is formed of a cast iron; and the surface layer 3, a manganese copper. In an example of the second combination, the base member 2 is formed of an austenitic stainless steel (e.g., SUS304 or SUS316); and the surface layer 3, a nickel plating layer. In an example of the third combination, the base member 2 is formed of manganese copper; and the surface layer 3, an aluminum plating layer. In an example of the fourth combination, the base member 2 is formed of a cold-rolled steel plate (SPCC) or a steel for general use; and the surface layer 3, a nickel plating layer or the like.

A method of forming a modified portion in the member having the above-described arrangement will be described below.

According to the present invention, a modified portion is formed of a magnetic material, and two cases are exemplified, namely, a case wherein the permeability of a modified portion is higher than that of a modified portion-formable region, and a case wherein the permeability of the modified portion is lower than that of the modified portion-formable region. The former case will be referred to a case A hereinafter; and the latter case, a case B.

A case wherein the surface layer 3 serves as a modified portion-formable region will be described first. A high-energy beam L, such as a laser beam or an electron beam, is substantially perpendicularly radiated onto the surface layer 3. As a result, the surface layer 3 and the base member 2 are heated and fused by the energy of the beam L, thus forming a fused region 4. Although the leading edge of the fused region 4 stops within the base member 2 in FIG. 1, it can be caused to penetrate the base member 2 by adjusting a beam output, a film thickness, and the like.

In order to form a modified portion corresponding to the case A, the following four combinations are available in the above-described combinations of the base member 2 and the surface layer 3: (1) the base member 2 is formed of a low-carbon steel; and the surface layer 3, an austenitic stainless steel, (2) the base member 2 is formed of an austenitic stainless steel; and the surface layer 3, a nickel plating layer, (3) the base member 2 consists of a manganese copper; and the surface layer 3, an aluminum plating layer, and (4) the base member 3 is formed of a cold-rolled steel plate; and the surface layer 3, a nickel plating layer.

In the combination (1), the fused region 4 exhibits a state wherein iron of the base member is fused in an austenitic stainless steel, and the nonmagnetic austenitic texture is lost, thus forming a ferromagnetic member. In the combination (2), nickel and a stainless steel are fused, so that the fused region 4 becomes a high-permeability alloy (maximum permeability: 60,000) having higher permeability than nickel (maximum permeability: 1,400). In the combination (3), aluminum and manganese copper are fused, so that the fused region 4 becomes a magnetic Hoisler alloy (75Cu-14Mn-10A, maximum permeability: 650). In the combination (4), the fused region 4 becomes a high-permeability alloy containing a large amount of nickel, as in the combination (2).

In order to form a modified portion corresponding to the case B, the following combination is available: (5) the base member 2 is formed of a steel for general use; and the surface layer 3, a nickel plating layer.

In the combination (5), the fused region 4 is formed of a steel for general use and nickel, and is formed into a magnetic member having lower permeability than nickel.

Subsequently, the surface of the member 1, in which the fused region 4 is formed, is finished and smoothened as needed. As a result, a surface portion of the fused region 4 becomes a modified portion 5 having different permeability from the surface layer 3.

Figure 2:
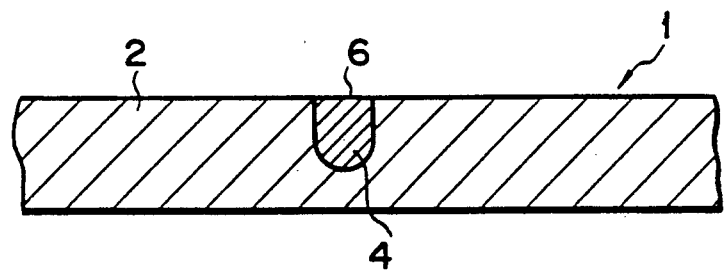
FIG. 2 is a sectional view showing a state wherein a surface layer is removed from the member shown in FIG. 1.

A case wherein the base member 2 is a modified portion-formable region will be described below. As shown in FIG. 2, the surface layer 3 is removed by grinding the surface of the member 1 shown in FIG. 1. In this case, if the permeability of the base member 2 is different from that of the fused region 4, a surface portion of the fused region 4 can be formed into a modified portion 6 having different permeability from the base member 2. For example, in the combination (1), since the base member is formed of a magnetic low-carbon steel (maximum permeability: 5,000), the permeability of the modified portion 6 can be made higher or lower than that of the base member 2. That is, a modified portion corresponding to either the case A or B can be formed. Furthermore, in the combinations (2) to (4), it is apparent that the permeability of the fused region 4 is higher than that of the base member 2, and hence the modified portion 6 corresponding to the case A can always be formed. A combination of the base member formed of a cast iron and the surface layer 3 formed of a manganese copper can be used to form a modified portion corresponding to the case B in addition to the above-described combinations.

Figure 3:
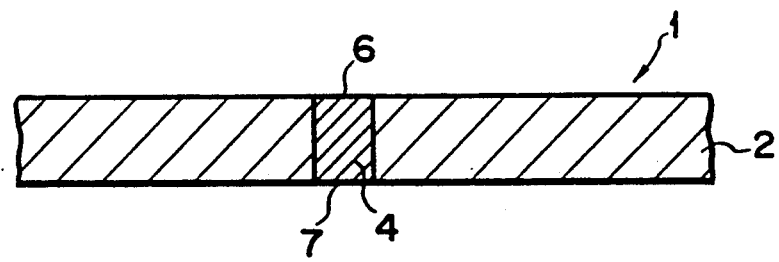
FIG. 3 is a sectional view showing a state wherein modified portions are formed in the upper and lower surfaces of the member shown in FIG. 2 by grinding its lower surface.

In addition, as shown in FIG. 3, if the lower surface of the base member 2 is ground, a modified portion 7 can be formed on the lower surface side.

Figure 4:
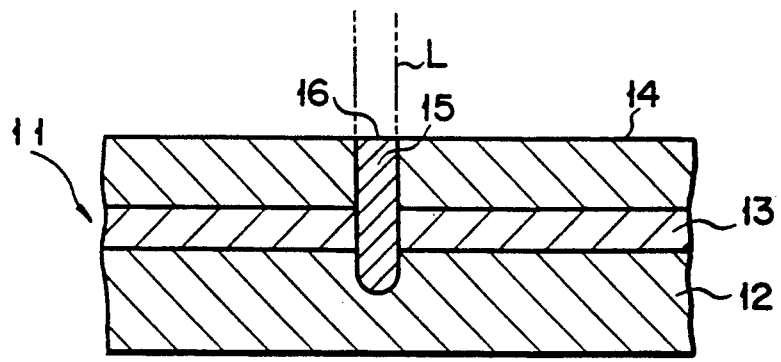
FIG. 4 is a sectional view of a member consisting of a three-layer member to which the method of forming a modified portion according to the embodiment of the present invention is applied.
Figure 5:
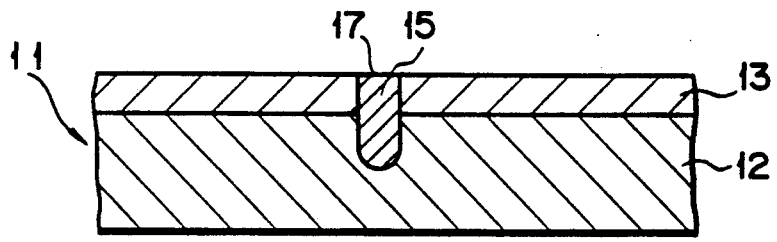
FIG. 5 is a sectional view showing a state wherein a surface layer is removed from the member in FIG. 4.
Figure 6:
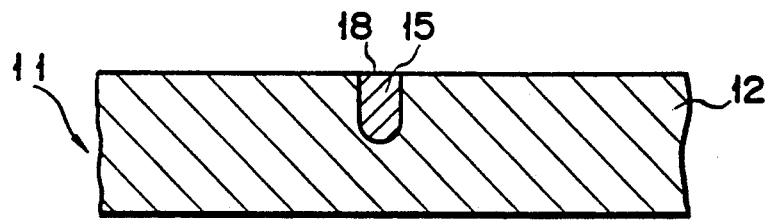
FIG. 6 is a sectional view showing a state wherein an intermediate layer is removed from the member in FIG. 5.
Figure 7:
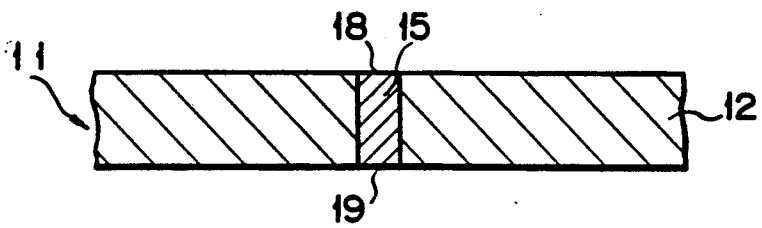
FIG. 7 is a sectional view showing a state wherein modified portions are formed in the upper and lower surfaces of the member shown in FIG. 6 by grinding its lower surface.

A case wherein the present invention is applied to a three-layer member will be described below. FIG. 4 is a sectional view of a member constituted by a three-layer member to which the method of forming a modified portion of the present invention is applied. A member 11 is designed such that an intermediate layer (second layer) 13 and a surface layer (first layer) 14 are sequentially formed on a base member (third layer) 12 formed of a nonmagnetic material, such as austenitic stainless steel (SUS304, SUS316). The intermediate and surface layers 13 and 14 are formed of magnetic and non-magnetic materials. For example, the intermediate layer 13 is formed of copper as a nonmagnetic material, and the surface layer 14 is formed of nickel as a magnetic material. Note that the intermediate layer 13 may be constituted by nickel or the like, while the surface layer 14 may be constituted by copper or the like. The copper and nickel layers are formed by a general plating method, and are then bonded to each other by a heat treatment. A high-energy beam L is substantially perpendicularly radiated onto the surface of the surface layer 14 of the member 11 having the above-described arrangement. As a result, the layers 13 and 14, and the base member 12 are heated and fused to form a ferromagnetic fused region 15 in which iron, nickel, and copper are fused. When the surface layer 14 serves as a modified portion-formable region, a surface portion of the fused region 15 becomes a modified portion 16 having higher permeability than the surface layer 14. When the intermediate layer 13 serves as a modified portion-formable region, a portion of the fused region 15 becomes a modified portion 17 having higher permeability than the intermediate layer 13 by grinding and removing the surface layer 14, as shown in FIG. 5. In addition, when the base member 12 serves as a modified portion-formable region, a portion of the fused region 15 becomes a modified portion 18 having higher permeability than the base member 12 by grinding and removing the intermediate and surface layers 13 and 14, as shown in FIG. 6. When the base member 12 is used as a modified portion-formable region in this manner, a modified portion 19 can be formed on the lower surface of the member 11 by grinding the lower surface of the base member 12 so as to expose the fused region 15 thereon, as shown in FIG. 7.

Note that a modified portion corresponding to the case B can be formed by properly selecting materials for these three layers.

In the above embodiment, each layer is made of a metal material. However, materials other than metal materials may be used. For example, a member may be designed such that a surface layer formed of iron zinc oxide ($Fe_2ZnO_4$) as a nonmetallic material is coated on a base member constituted by a cold-rolled steel plate. Upon formation of a ferromagnetic fused region by radiating a high-energy beam onto the member from the surface layer side, the surface layer is removed. As a result, a modified portion having higher permeability than the cold-rolled steel plate can be formed at a portion of the fused region in the same manner as in FIG. 2.

Note that in either of the embodiments, since a fused region obtained by fusing a plurality of layers is basically formed of a magnetic material, the range of types of material and composition applicable to each layer can be widened, thus facilitating formation of a modified portion.

A magnetic recording member shown in FIG. 8 can be formed by applying the above-described method. More specifically, a plurality of linear modified portions 22 are formed in a surface portion of a member 21, in which the above-described modified portions can be formed, by radiating a laser beam in accordance with data to be recorded. In this case, a magnetic card in which various data are recorded can be obtained by changing the intervals and widths of the modified portions, and the order of the modified portions having large and small widths.

Figure 10:
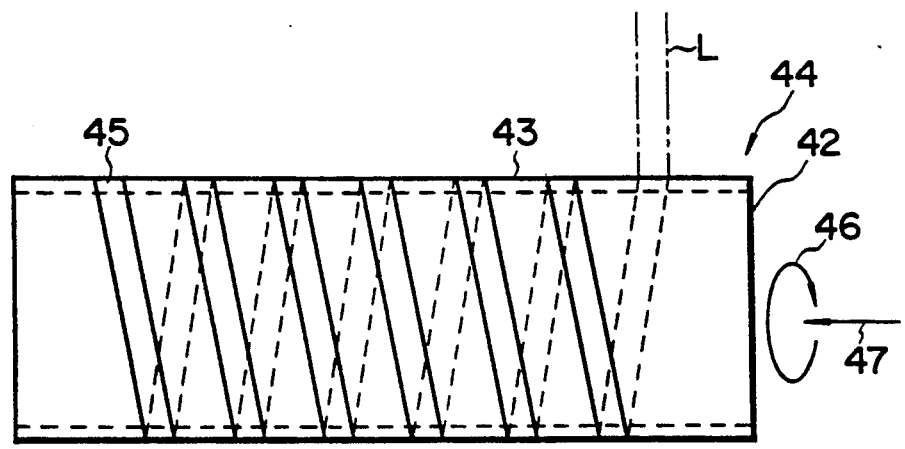
FIG. 10 is a side view of a magnetic scale having a spiral modified portion.

FIGS. 9 and 10 are side views respectively showing magnetic scales to which the method of forming a modified portion described above is applied. In FIG. 9, a member 34 is formed by coating a surface layer 33 on a surface of a columnar base member 32. In this case, the base member 32 and the surface layer 33 are respectively made of the same materials as those of the base member 2 and the surface layer 3 in FIG. 1. Annular modified portions 35 are formed at predetermined intervals in the member 34. These modified portions 35 are formed by perpendicularly radiating a high-energy beam onto the surface of the surface layer 33 while rotating the member 34 in a direction indicated by an arrow 36, and grinding the member 34 as needed. As described above, the surface layer 33 may be completely removed by grinding. In this manner, a magnetic scale 31 having a smooth surface can be obtained.

Since the modified portions 35 have ferromagnetic properties, the displacement of the magnetic scale 31 in the longitudinal direction can be measured by detecting the modified portions 35 using a magnetic sensor 37.

In FIG. 10, a member 44 is formed by coating a surface layer 43 on a surface of a columnar base member 42. The base member 42 and the surface layer 43 are also made of the same materials as those of the base member 2 and the surface layer 3 in FIG. 1. A spiral modified portion 45 is formed in the member 44. The modified portion 45 can be formed by substantially perpendicularly radiating a high-energy beam L onto the surface of the surface layer 43 while moving the member 44 in a direction indicated by an arrow 46.

A magnetic scale 41 can be formed by grinding the member 44, in which the modified portion 45 is formed, in the same manner as that of the member 34. Similar to the modified portion 35, the modified portion 45 is ferromagnetic.

When a modified portion is formed by the above-described method, data is recorded by changing the material of a member into a high-permeability portion by using a high-energy beam without using an external magnetic field. Therefore, data is not changed even if mishandling, such as placing a magnet near the member, occurs, or the member is used at high temperatures (100° C. or more).

In addition, even if such a recording member used as a component of a machine element is exposed to a high temperature of 500° C. because of frictional heat, mishandling, or the like, the shape and position of a modified portion as well as the data undergo almost no change.

Materials for forming layers serving as modified portion-formable regions can be selected from a wide range of materials as long as they can form magnetic modified portions. For example, if a recording member is to be used under conditions requiring good wear resistance, a material having high wear resistance is used for a layer serving as a modified portion-formable region, so that a modified portion having an excellent wear resistance can be obtained by smoothening a surface of the member.

The magnetic properties of materials constituting a fused region can be estimated in accordance with the magnitude of permeability. The permeability can be adjusted in the range until several thousands $\mu$ by changing metal components and composition. In order to change metal components and a composition in the fused region, the compositions of layers constituting a laminated member, the output of a high-energy beam, and the like may be adjusted. The metal components and composition of the fused region can be properly selected in accordance with a purpose, a cost, and the like.

As the above-described magnetic sensor 37, a sensor using a magnetoresistance element, or a general magnetic head may be used. Although the magnetic sensor 37 is shown only in FIG. 9, it can be used in other cases in the same manner. When data is read by this magnetic sensor 37, it is placed near a modified portion. If regions between modified portions are nonmagnetic portions, since the permeability of the nonmagnetic portions is about 1, and the permeability of the modified portions is several tens to several thousands, the difference in permeability is very large. Therefore, the S/N ratio of an electrical signal obtained by the magnetic sensor 37 is high, and read precision can be greatly increased.

Figure 11:
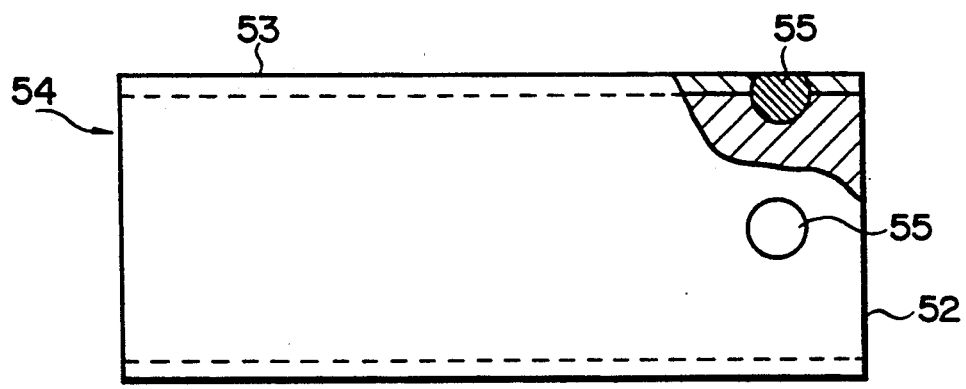
FIG. 11 is a partial sectional side view of a shaft member having a large modified portion.

As shown in FIG. 11, when a shaft member 54 is formed by coating a surface layer 53 on a base member 52, and a relatively large modified portion 55 is formed by using an arc generated by an arc welder as a high-energy beam, this modified portion can be easily detected by very small magnetic sensor. That is, positioning of a movable component, which is conventionally performed by a large sensor, such as a limit switch, can be performed by a small magnetic sensor, thus facilitating miniaturization of a machine.

Note that the present invention is not limited to the above-described embodiments, but can be variously modified and changed. For example, in the above embodiments, each member is constituted by a two- or three-layer member. However, the number of layers is not limited to a specific number as long as they can be fused to form a magnetic modified portion having different permeability from a non-fused portion of a modified portion-formable region. In addition, materials are not limited to those described in the above embodiments as long as a modified portion having high-permeability can be formed.

Examples in which the present invention is practically applied will be described below.

EXAMPLE 1

A nonmagnetic steel (equivalent to SUS316) powder was flame-sprayed on a surface of a low-carbon steel (SS41P, thickness: 4.5 mm) to have a thickness of about 0.3 mm, thus forming a member element as shown in FIG. 1. The element was then irradiated with a beam having a spot size of 0.6 mm and an output of 500 W from a carbon dioxide gas laser while the element was moved at a feed speed of 2 m/min, thereby forming linear modified portions consisting of a ferromagnetic steel containing 5% chromium and 3% nickel. In this case, this process was designed such that the modified portions had a width (represented by S in FIG. 1) of 0.5 mm and a fused region in the base member had a depth (represented by T in FIG. 1) of 0.8 mm.

Subsequently, the flame-sprayed surface of the element in which the modified portions were formed in this manner was ground to have a smooth surface, thus obtaining a recording member with a flame-sprayed surface having a thickness of about 0.2 mm. When a recording signal was read by using the general sensor shown in FIG. 9, a satisfactory electrical signal was obtained by setting the intervals between modified portions to be 0.2 mm or more.

EXAMPLE 2

A nonmagnetic, high-hardness self-fluxing alloy having a composition of 15% chromium, 3% boron, 3% iron, 3.5% silicon, 0.5% carbon, and 75% nickel was flame-sprayed on a surface of a rod member consisting of low-carbon steel (equivalent to SS41) to have a thickness of 0.3 mm, thereby forming a member element. The element was then irradiated with a beam having a spot size of 1.2 mm and an output of 1,000 W from a carbon dioxide gas laser while the element was rotated at 150 mm/min and was moved at a proper feed speed. As a result, a spiral modified portion (width: 1.2 mm) was formed, thus forming a magnetic scale.

Since a large amount of iron was fused into a fused region serving as the modified portion, the fused region had a composition similar to that of a magnetic core material of a small transformer, and hence was formed into a magnetic material having very high-permeability. When the pitch of the spiral modified portion was set to be about 2 mm, measurement could be performed with a repeat accuracy of about 0.1 mm. In addition, the surfaces of the modified portion and the flame-sprayed surface had a hardness value of Hv700 or more, thus exhibiting high wear resistance. When this magnetic scale was used for a component of a machine, which was subjected to substantial wear, it exhibited a long service life.

EXAMPLE 3

A copper plating layer having a thickness of 0.02 mm was formed on a surface of an SUS316 plate having a thickness of 0.8 mm, and a 0.15-mm thick nickel plating layer was formed on the resultant structure, thus forming a member element. The element was then irradiated with a beam having a spot size of 0.3 mm and an output of 300 W from a carbon dioxide gas laser while the element was moved at a feed speed of 1.2 m/min, so that a fused region having a width of 0.3 mm and a thickness of 0.5 mm in the SUS plate was formed. When the plating layers were removed by grinding the surface of the element, 0.2-mm wide modified portions were formed, and a 0.7-mm thick magnetic card was obtained. In this case, the modified portions could be arranged at arbitrary intervals of 0.2 mm or more, and hence a large amount of data could be recorded.

EXAMPLE 4

An iron zinc oxide ($Fe_2ZnO_4$) material having a thickness of 500 $\mu$m was flame-sprayed on a cold-rolled a gas arc method, thus obtaining a member element. A 1,000-W carbon dioxide gas laser beam was then focused/radiated onto the element from the flame-sprayed surface side through a lens while the element was moved at 1.0 m/min. A 1-mm wide fused region was formed in the beam-irradiated portion so as to extend to the lower surface of the SPCC plate. Thereafter, the flame-sprayed surface was removed up to the interface of the SPCC plate, so that modified portions were formed in a surface layer portion of the SPCC plate. Upon measurement of the permeability of the modified portions and the base member, it was found that the modified portions had higher permeability. In addition, the lower surface of the SPCC plate (opposite to the radiation side of the laser beam) was ground so as to remove the remainder of the fused portion formed by the laser beam, thereby forming modified portions in the lower surface. The modified portions in the lower surface also exhibited higher permeability than the SPCC plate.

EXAMPLE 5

A 500-$\mu$m thick Ni plating layer was formed on a 2.8-mm thick SPCC plate to obtain a member element.

A 1,000-W carbon dioxide gas layer beam was then focused/radiated onto the element from the plating layer side through a lens while the element was moved at 1.0 m/min. As a result, a 1-mm wide fused region was in the beam-irradiated portion so as to extend to the lower surface of the SPCC plate. When the upper surface of the element was slightly ground, modified portions having higher permeability than Ni were formed in the fused region in a surface layer portion of the element.

EXAMPLE 6

A nickel plating layer (maximum permeability: 600) was formed on a base member consisting of a steel for general use (0.5% C, maximum permeability: 1,300) to prepare a member element. A laser beam was then radiated onto the member element to fuse the base member and the plating layer, thus forming a low-permeability fused region (maximum permeability: 1.05) containing 23% Ni and 0.4% C. In this case, a peripheral portion of the fused portion was quickly heated and cooled, and hence was quenched. As a result, the permeability of the fused portion was decreased (maximum permeability: 140). For this reason, annealing was performed to increase the maximum permeability of the base member at the peripheral portion of the fused region up to 1,300. In this case, the permeability of the fused region was slightly increased, and its maximum permeability was increased to about 5. Since both the plating layer and the base member have much higher permeability than the fused region, the plating layer may be used as a modified portion-formable region, or the base member may be formed into a modified portion-formable region by grinding the plating layer.

In this example, the steel for general use is used in large amounts, and is advantageous in terms of cost. In addition, since the difference in permeability between the modified portion and the base member or the plating layer is large, excellent characteristics as a recording member can be obtained.

EXAMPLE 7

A flame-sprayed surface (thickness: 0.2 mm) consisting of an alloy power of a manganese copper (60% Mn, 30% Cu, 10% Si) was formed on a base member consisting of a cast iron (1.7% Si, 3.3% C, 0.5% Mn, balance of Fe, maximum permeability: 700), thus forming a member element. A laser beam was radiated on this member element to fuse the base member and the flame-sprayed layer. As a result, a 0.7-mm thick fused region was formed. This fused region was formed into a magnetic member containing 8% Mn, 4% Cu, 3% C, and 3% Si and having permeability as low as about 3. Thereafter, the flame-sprayed layer was ground and removed to form a low-permeability modified portion on the high-permeability base member. Since the difference in permeability between the base member and the modified portion is large, excellent magnetic recording can be performed.

The cast iron used as the base member is used in large amounts for industrial machines, machine tools, and the like. Hence, the recording member in this example can be produced at a low cost and can be used for many applications.

Figure 12:
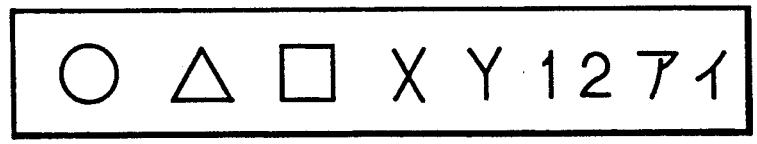
FIG. 12 shows a modified portion for characters or symbols.

In the above-described examples, the modified portions were used for a bar code. However, characters, such as numbers, or signals can be recorded by a laser beam, as shown in FIG. 12.

As has been described above, according to the present invention, a modified portion having different permeability from other portions of a modified portion-formable region is formed by fusing at least two layers upon radiation of a high-energy beam. Therefore, data can be recorded by using this modified portion without using an external magnetic field as in the conventional technique. In this case, the recorded data can be stably maintained without being destructed by an external magnetic field generated by, e.g., a magnet, shock, or high temperatures. In addition, the data is not magnetized, and hence is not easily read from the outside.

Since a high-permeability portion is formed upon fusion using a high-energy beam, the magnetic properties are not easily changed at a relatively high temperature.

Since modified portion is basically formed of a magnetic material the range of types of material and composition applicable to each layer can widened, thus facilitating formation of a modified portion.

Since no coat and thin film are required, wear resistance can be increased by properly selecting materials. Therefore, the recording member can be used in an environment of substantial wear.

According to the magnetic recording member of the present invention, data is recorded by using the above-described modified portions. Therefore, no magnetic metal coat and thin film are required, a strong structure can be realized, and the service life can be prolonged.

What is claimed is:

1. A method of forming a magnetically modified portion, comprising the steps of:
   preparing a member which comprises a plurality of layers having different compositions disposed between opposed first and second surfaces;
   selectively radiating, via said first surface of said member, a high-energy beam onto said member so as to fuse at least two layers, thereby forming a fused portion in said member;
   forming a first new surface of said member by removing from said member said first surface to a depth at least as great as the thickness of one of said two layers, wherein after said removing there remains at said first new surface a layer including a remaining fused portion corresponding to a magnetically modified portion made of a magnetic material having a lower permeability than that of a non-fused portion at said new surface of said member; and
   forming a second new surface by removing said second surface a sufficient depth so that said remaining fused portion extends through the member from the first new surface to the second new surface.

2. A method of forming a magnetically modified portion, comprising the steps of:
   preparing a member which comprises a plurality of layers having different compositions disposed between opposed first and second surfaces;
   selectively radiating, via said first surface of said member, a high-energy beam onto said member so as to fuse at least two layers, thereby forming a fused portion in said member; and
   forming a new surface of said member replacing said second surface by removing from said member said second surface to a depth reaching at least as far as said fused portion so that said fused portion is exposed at said new surface and extends through said member from said first surface to said new surface, wherein after said removing there remains at said new surface a layer including said exposed fused portion corresponding to a magnetically modified portion made of a magnetic material having a lower permeability than that of non-fused portion at said first surface of said member.

* * * * *